No. 696,668. Patented Apr. 1, 1902.
C. C. FAST.
BEAN HARVESTER.
(Application filed Jan. 26, 1900. Renewed Feb. 28, 1902.)
(No Model.)
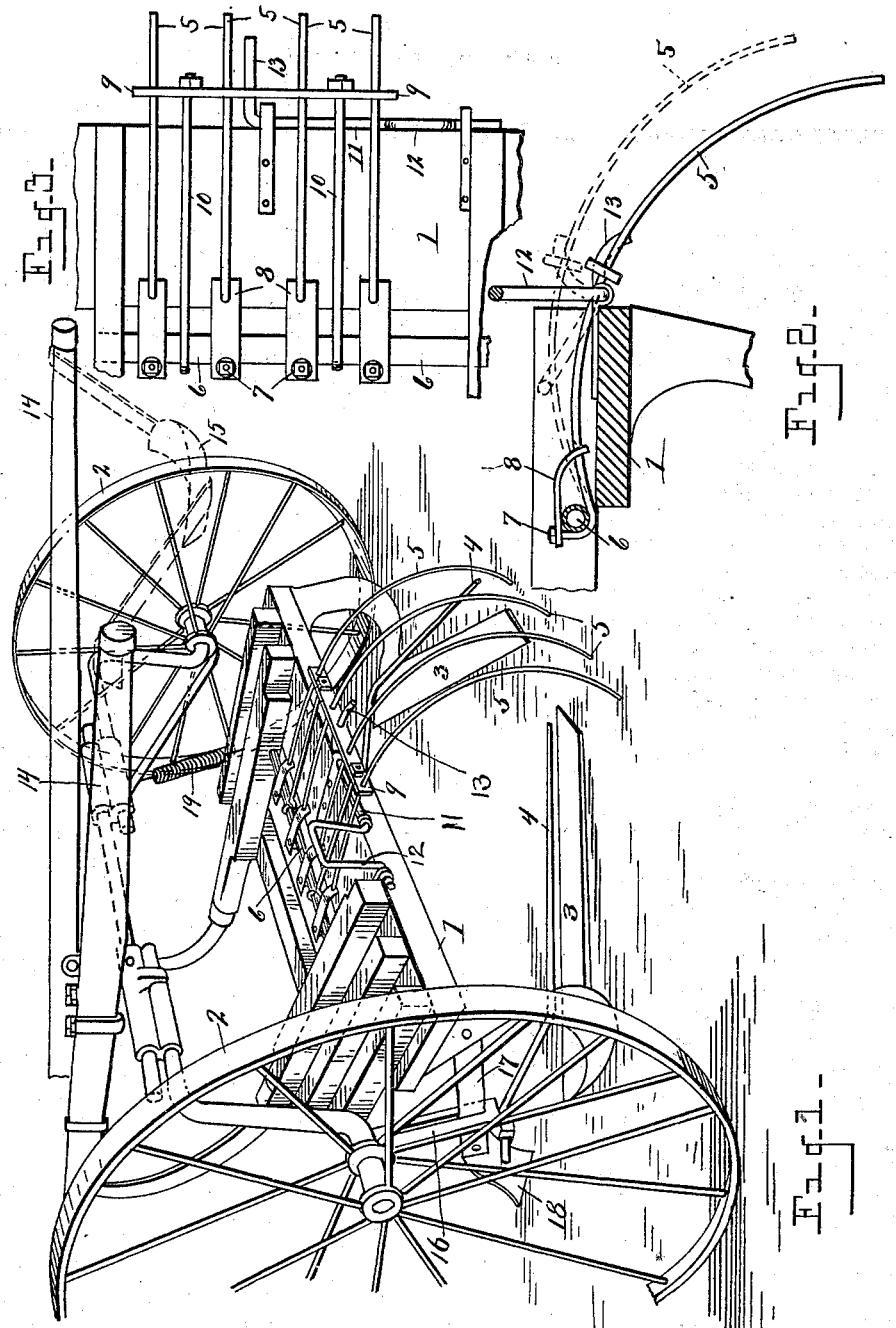
WITNESSES.
INVENTOR.
Clinton C. Fast,
By R. B. Wheeler & Co.
Attorneys.

United States Patent Office.

CLINTON C. FAST, OF POTTERVILLE, MICHIGAN.

BEAN-HARVESTER.

SPECIFICATION forming part of Letters Patent No. 696,668, dated April 1, 1902.

Application filed January 26, 1900. Renewed February 28, 1902. Serial No. 96,065. (No model.)

*To all whom it may concern:*

Be it known that I, CLINTON C. FAST, a citizen of the United States of America, residing at Potterville, in the county of Eaton, State of Michigan, have invented certain new and useful Improvements in Bean-Harvesters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in bean-harvesters; and it consists in the construction and arrangement of the parts hereinafter fully set forth, and pointed out particularly in the claims.

The object of the invention is to provide simple and efficient means for severing two rows of vines, forcing them together in a single row, and collecting and bunching the combined rows as the machine is drawn over the field.

The above object is attained by the mechanism illustrated in the accompanying drawings, in which—

Figure 1 is a perspective view of a portion of a bean-harvesting machine involving my invention. Fig. 2 is an enlarged transverse section through the frame, on which are mounted the hinged or pivoted rake-tines. Fig. 3 is a plan view of the frame and rake.

Referring to the characters of reference, 1 designates the frame of the machine, supported in any suitable manner upon transporting-wheels 2. The wheels are sufficiently far apart to enable the machine to straddle two rows of beans.

Depending from the frame of the machine are the plows or beveled knives 3, standing at an angle to the longitudinal axis of the machine and converging rearwardly. These knives are located contiguous to the ground and are adapted to sever the rows of beans as the machine moves along. Located above the knives are the guide-rods 4, which are adapted to receive and support the severed vines in an upright position.

The angle of the knives and guide-rods is such that the severed vines of two rows are worked rearwardly by the movement of the machine, so that the vines of the two rows are thrown together at the rear point of said knives.

To receive and bunch the severed vines of beans, I employ a rake whose tines 5 stand in the rear of the knives 3 and are adapted to receive and collect the beans discharged from the ends of said knives. The tines of the rake are mounted on the main frame, their inner ends being bent partially around a transverse shaft 6 and threaded to receive a nut 7, which bears upon a curved plate 8, which receives the tine of the rake on opposite sides of said shaft, whereby, through the medium of the nut 7, the rake-tine is secured to said shaft 6. All of the tines of the rake pass through a cross-bar 9, located at the rear of the frame and secured to the shaft 6 by long bolts 10. Journaled upon the frame is a crank-shaft 11, having a vertical crank 12 therein, adapted to be engaged by the foot of the operator, and having a right-angled end portion 13, which passes freely through the cross-bar 9. By depressing the crank 12 the right-angled end portion of the shaft 11 will raise the cross-bars 9 and carry upward the tines of the rake, as clearly shown by dotted lines in Fig. 2, whereby the operator may at will discharge from the machine the accumulated vines in bunches.

In bean-harvesting it is essential that the beans be removed from the ground as soon as possible. It is the common practice to follow the bean-harvesting machine and fork or rake the severed vines into bunches or shocks. By means of my invention the vines may be bunched as rapidly as they are severed, thereby saving the time and labor necessary to bunch them by hand.

Depending from the rear ends of the poles 14 is a seat 15, (shown by dotted lines in Fig. 1,) which supports the operator and places him in a position to readily manipulate the rake.

A slotted casting 16 depends from the frame and serves as a guide for the pivoted arm 17, which passes therethrough and carries a divider 18 at its forward end, adapted to divide the vines in advance of the cutter-knives. A spring 19 is employed to exert a downward pressure upon the knife-carrying frame to maintain the knives in proper relation to the surface of the ground when the wheels are passing over an obstruction.

Having thus fully set forth my invention, what I claim is—

1. In a bean-harvester, the combination with the frame and transporting-wheels, of the inclined rearwardly-converging knives, the rake disposed at the rear of said converging knives, a shaft extending longitudinally of the frame, the ends of the tines of said rake bent partly around said shaft from the underside and threaded, plates through which the tines pass, said plates lying across the upper face of said shaft and receiving the threaded ends of the tines in the rear thereof, nuts screwed onto the threaded ends against said plates, a transverse bar at the rear of the machine common to all of said tines and through which said tines pass, bolts connected with the shaft and secured at their outer ends to said bar and means for raising and lowering said bar to actuate the tines in unison.

2. In a bean-harvester, the combination of the frame and transporting-wheels, the rearwardly-converging knives, the rake disposed at the discharge end of said knives, a shaft journaled in the frame, the tines of said rake clamped to said shaft, a movable cross-bar having apertures therethrough and extending longitudinally of the frame, said bar being common to all of the rake-tines which pass freely through the apertures in said bar, bolts journaled to said shaft and secured at their outer ends to said bar, a rock-shaft journaled at the rear of the frame having an upwardly-projecting crank formed therein and having an integral end portion bent outwardly at right angles to said crank passing freely through said bar and adapted to slide therein.

In testimony whereof I sign this specification in the presence of two witnesses.

CLINTON C. FAST.

Witnesses:
T. S. SUTLIFF,
ADAM H. SPERRY.